United States Patent
Kuo et al.

(10) Patent No.: US 7,004,124 B2
(45) Date of Patent: Feb. 28, 2006

(54) VALVE STRATEGY FOR OPERATING A CONTROLLED AUTO-IGNITION FOUR-STROKE INTERNAL COMBUSTION ENGINE

(75) Inventors: Tang-Wei Kuo, Troy, MI (US); Barry L. Brown, Lake Orion, MI (US); James A. Eng, Sterling Heights, MI (US); Paul M. Najt, Bloomfield Hills, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/611,845

(22) Filed: Jul. 1, 2003

(65) Prior Publication Data

US 2005/0000478 A1    Jan. 6, 2005

(51) Int. Cl.
F01L 1/34     (2006.01)
(52) U.S. Cl. .............................. 123/90.15; 123/90.16; 123/90.17; 123/90.18; 123/320; 123/198 F
(58) Field of Classification Search ............. 123/90.11, 123/90.12, 90.15, 90.16, 90.17, 90.18, 198 F, 123/481, 320, 321, 322
See application file for complete search history.

(56) References Cited

U.S. PATENT DOCUMENTS

| | | | |
|---|---|---|---|
| 3,714,932 A * | 2/1973 | Meacham et al. ........... 123/316 |
| 4,350,129 A * | 9/1982 | Nakajima et al. ........... 123/310 |
| 4,446,830 A | 5/1984 | Simko et al. ................ 123/276 |
| 4,703,734 A * | 11/1987 | Aoyama et al. ............. 123/432 |
| 5,590,626 A * | 1/1997 | Hitomi et al. ........... 123/90.15 |
| 5,623,904 A * | 4/1997 | Matsumoto ............ 123/339.23 |
| 5,713,328 A | 2/1998 | Anderson et al. ........... 123/299 |
| 5,746,182 A * | 5/1998 | Nada ........................... 123/492 |
| 6,082,342 A | 7/2000 | Duret et al. ................. 123/568 |
| 6,155,217 A * | 12/2000 | Shiraishi et al. .......... 123/90.15 |
| 6,178,956 B1 * | 1/2001 | Steinmann et al. .... 123/568.21 |
| 6,276,334 B1 * | 8/2001 | Flynn et al. ................. 123/435 |
| 6,286,478 B1 * | 9/2001 | Atago et al. ................. 123/306 |
| 6,336,436 B1 * | 1/2002 | Miyakubo et al. .......... 123/295 |
| 6,374,813 B1 * | 4/2002 | Iida et al. .............. 123/568.14 |
| 6,442,200 B1 * | 8/2002 | Fukui .......................... 375/239 |
| 6,530,351 B1 * | 3/2003 | Mikame .................. 123/90.15 |
| 6,626,164 B1 * | 9/2003 | Hitomi et al. ............... 123/679 |
| 6,752,123 B1 * | 6/2004 | Unger et al. ................ 123/305 |
| 2001/0017114 A1 * | 8/2001 | Mikame .................. 123/90.15 |

FOREIGN PATENT DOCUMENTS

WO    WO 01/46571    6/2001
WO    WO 01/46573    6/2001

* cited by examiner

Primary Examiner—Thomas Denion
Assistant Examiner—Kyle M. Riddle
(74) Attorney, Agent, or Firm—Kathryn A. Marra (57) ABSTRACT

Low load operating point for a controlled auto-ignition four-stroke internal combustion engine is reduced without compromising combustion stability through a valve control operative to establish sub-atmospheric pressure conditions within the combustion chamber into which fuel and exhaust gases are introduced.

39 Claims, 4 Drawing Sheets

VALVE STRATEGY FOR OPERATING A CONTROLLED AUTO-IGNITION FOUR-STROKE INTERNAL COMBUSTION ENGINE

CROSS-REFERENCE TO RELATED APPLICATIONS

This application is related to application Ser. No. 10/611,366 entitled "INJECTION STRATEGY FOR OPERATING A DIRECT-INJECTION CONTROLLED AUTO-IGNITION FOUR-STROKE INTERNAL COMBUSTION ENGINE" filed on even date herewith and incorporated herein by reference.

TECHNICAL FIELD

The present invention is related to operating a four-stroke internal combustion engine.

BACKGROUND OF THE INVENTION

The automotive industry is continually researching new ways of improving the combustion process of the internal combustion engine in an effort to improve fuel economy and meet or exceed emission regulatory targets, and to meet or exceed consumer expectations regarding emissions, fuel economy and product differentiation.

Most modern conventional internal combustion engines attempt to operate around stoichiometric conditions. That is providing an optimal air/fuel ratio of substantially 14.6 to 1 that results in substantially complete consumption of the fuel and oxygen delivered to the engine. Such operation allows for exhaust gas aftertreatment by 3-way catalysts which clean up any unconsumed fuel and combustion byproducts such as NOx and CO. Most modern engines are fuel injected having either throttle body injection (TBI) or multi-port fuel injection (MPFI) wherein each of a plurality of injectors is located proximate an intake port at each cylinder of a multi-cylinder engine. Better air/fuel ratio control is achieved with a MPFI arrangement; however, conditions such as wall wetting and intake runner dynamics limit the precision with which such control is achieved. Fuel delivery precision can be improved by direct in-cylinder injection (DI). So called linear oxygen sensors provide a higher degree of control capability and when coupled with DI suggest an attractive system with improved cylinder-to-cylinder air/fuel ratio control capability. However, in-cylinder combustion dynamics then become more important and combustion quality plays an increasingly important role in controlling emissions. As such, engine manufacturers have concentrated on such things as injector spray patterns, intake swirl, and piston geometry to affect improved in-cylinder air/fuel mixing and homogeneity.

While stoichiometric gasoline four-stroke engine and 3-way catalyst systems have the potential to meet ultra-low emission targets, efficiency of such systems lags behind so-called lean-burn systems. Lean-burn systems also show promise in meeting emission targets for NOx through combustion controls, including high exhaust gas dilution and emerging NOx aftertreatment technologies. However, lean-burn systems still face other hurdles, for example, combustion quality and combustion stability particularly at low load operating points and high exhaust gas dilution.

Lean-burn engines, at a most basic level, include all internal combustion engines operated with air in excess of that required for the combustion of the fuel charge provided. A variety of fueling and ignition methodologies differentiate lean-burn topologies. Spark ignited systems (SI) initiate combustion by providing an electrical discharge in the combustion chamber. Compression ignition systems (CI) initiate combustion by combustion chamber conditions including combinations of air/fuel ratio, temperature and pressure among others. Fueling methods may include TBI, MPFI and DI. Homogeneous charge systems are characterized by very consistent and well vaporized fuel distribution within the air/fuel mixture as may be achieved by MPFI or direct injection early in the intake cycle. Stratified charge systems are characterized by less well vaporized and distributed fuel within the air/fuel mixture and are typically associated with direct injection of fuel late in the compression cycle.

Known gasoline DI engines may selectively be operated under homogeneous spark ignition or stratified spark ignition modes. A homogeneous spark ignited mode is generally selected for higher load conditions while a stratified spark ignition mode is generally selected for lower load conditions.

Certain DI compression ignition engines utilize a substantially homogeneous mixture of preheated air and fuel and establish pressure and temperature conditions during engine compression cycles that cause ignition without the necessity for additional spark energy. This process is sometimes called controlled auto-ignition. Controlled auto-ignition is a predictable process and thus differs from undesirable pre-ignition events sometimes associated with spark-ignition engines. Controlled auto-ignition also differs from well-known compression ignition in diesel engines wherein fuel ignites substantially immediately upon injection into a highly pre-compressed, high temperature charge of air, whereas in the controlled auto-ignition process the preheated air and fuel are mixed together prior to combustion during intake events and generally at compression profiles consistent with conventional spark ignited four-stroke engine systems.

Four-stroke internal combustion engines have been proposed which provide for auto-ignition by controlling the motion of the intake and exhaust valves associated with a combustion chamber to ensure that a air/fuel charge is mixed with combusted gases to generate conditions suitable for auto-ignition without the necessity for externally pre-heating intake air or cylinder charge or for high compression profiles. In this regard, certain engine have been proposed having a cam-actuated exhaust valve that is closed significantly later in the four-stroke cycle than is conventional in a spark-ignited four-stroke engine to allow for substantial overlap of the open exhaust valve with an open intake valve whereby previously expelled combusted gases are drawn back into the combustion chamber early during the intake cycle. Certain other engines have been proposed that have an exhaust valve that is closed significantly earlier in the exhaust cycle thereby trapping combusted gases for subsequent mixing with fuel and air during the intake cycle. In both such engines the exhaust valve is opened only once in each four-stroke cycle. Certain other engines have been proposed having a hydraulically controlled exhaust valve that is opened twice during each four-stroke cycle—once to expel combusted gases from the combustion chamber into the exhaust passage during the exhaust cycle and once to draw back combusted gases from the exhaust passage into combustion chamber late during the intake cycle. All of these proposed engines rely upon port fuel injection. Another proposed engine, however, has hydraulically controlled intake and exhaust valves wherein the exhaust valve is opened twice during each four-stroke cycle and additionally utilizes direct combustion chamber fuel injection for injecting fuel during either the intake or compression cycle.

However advantageous such lean-burn engine systems appear to be, certain shortfalls with respect to combustion quality and combustion stability, particularly at low load operating points and high exhaust gas dilution, continue to exist. Such shortfalls lead to undesirable compromises including limitations on how much a fuel charge can effectively be leaned out during low load operating points while still maintaining acceptable combustion quality and stability characteristics.

SUMMARY OF THE INVENTION

It is recognized that homogeneous air/fuel charges within a combustion chamber are generally desirable in a variety of internal combustion engines, including engines employing strategies such as TBI, MPFI, DI SI, CI, controlled auto-ignition, stoichiometric, lean-burn and combinations and variants thereof. A lean-burn four-stroke internal combustion engine is generally desirable. Furthermore, such an engine exhibiting high combustion stability at low load operating points is desirable. Moreover, such an engine capable of extended lean operation into heretofore unattained low load operating point regions is desirable.

The present invention provides these and other desirable aspects in a method of operating a four-stroke internal combustion engine with extended capability at low engine loads while maintaining or improving combustion quality, combustion stability and NOx emissions.

In accordance with the present invention, a low pressure event is established within the combustion chamber during the intake stroke of the piston. The depth and duration of the low pressure event directly affects the combustion stability and low load limit of the engine. Preferably, intake and exhaust valve phasing, or opening and closing timing is used to establish the low pressure event profiles.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
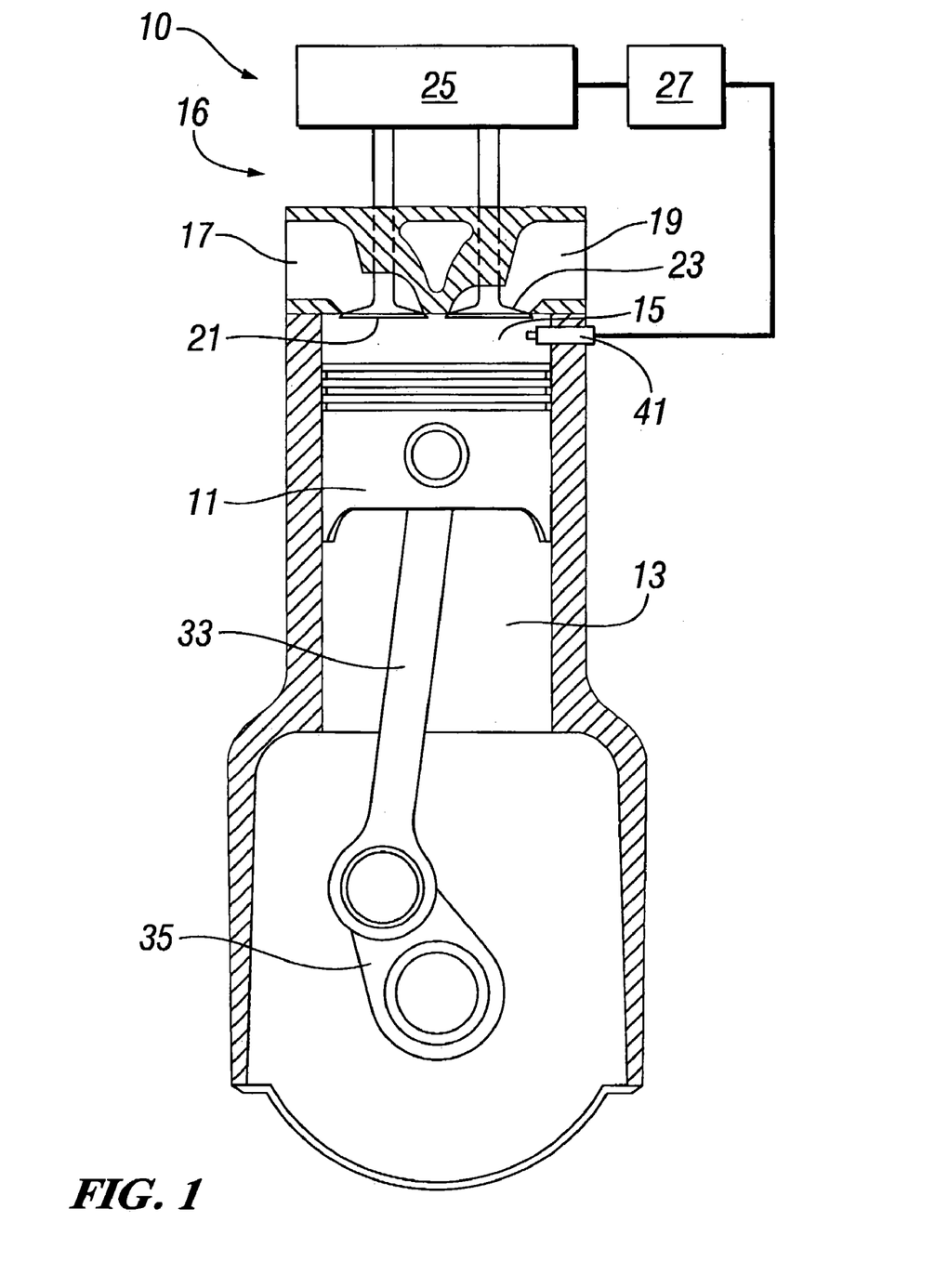
FIG. 1 is a schematic illustration of a single cylinder, direct-injection, four-stroke internal combustion engine in accordance with the present invention.

With reference first to FIG. 1, an exemplary single cylinder four-stroke internal combustion engine system (engine) 10 suited for implementation of the present invention is schematically illustrated. It is to be appreciated that the present invention is equally applicable to a multi-cylinder four-stroke internal combustion engine. The present exemplary engine 10 is shown configured for direct combustion chamber injection (direct injection) of fuel vis-à-vis fuel injector 41. Alternative fueling strategies including port fuel injection or throttle body fuel injection may also be used in the implementation of the present invention; however, the preferred approach is direct injection. Similarly, while widely available grades of gasoline and light ethanol blends thereof are preferred fuels, alternative liquid and gaseous fuels such as higher ethanol blends (e.g. E80, E85), neat ethanol (E99), neat methanol (M100), natural gas, hydrogen, biogas, various reformates, syngases etc. may also be used in the implementation of the present invention.

With respect to the base engine, a piston 11 is movable in a cylinder 13 and defines therein a variable volume combustion chamber 15. Piston 11 is connected to crankshaft 35 through connecting rod 33 and reciprocally drives or is reciprocally driven by crankshaft 35. Engine 10 also includes valve train 16 illustrated with a single intake valve 21 and a single exhaust valve 23 though multiple intake and exhaust valve variations are equally applicable for utilization with the present invention. Valve train 16 also includes valve actuation means 25 which may take any of a variety of forms including, preferably, electrically controlled hydraulic or electromechanical actuation. Alternative valve actuation means adaptable for implementation in conjunction with the present invention include multi-profile cams, cam phasers and other mechanically variable valve actuation technologies implemented individually or in combination with another. Intake passage 17 supplies air into the combustion chamber 15. The flow of the air into the combustion chamber 15 is controlled by intake valve 21 during intake events. Combusted gases are expelled from the combustion chamber 15 through exhaust passage 19 with flow controlled by exhaust valve 23 during exhaust events.

Engine control is provided by computer based control 27 which may take the form of conventional hardware configurations and combinations including powertrain controllers, engine controllers and digital signal processors in integrated or distributed architectures. In general, control 27 includes at least one microprocessor, ROM, RAM, and various I/O devices including A/D and D/A converters and power drive circuitry. Control 27 also specifically includes controls for valve actuation means 25 and fuel injector 41. Controller 27 includes the monitoring of a plurality of engine related inputs from a plurality of transduced sources including engine coolant temperature, outside air temperature, manifold air temperature, operator torque requests, ambient pressure, manifold pressure in throttled applications, displacement and position sensors such as for valve train and engine crankshaft quantities, and further includes the generation of control commands for a variety of actuators as well as the performance of general diagnostic functions. While illustrated and described as integral with controller 27, the control and power electronics associated with valve actuation means 25 and fuel injector 41 may be incorporated as part of distributed smart actuation scheme wherein certain monitoring and control functionality related to respective subsystems are implemented by programmable distributed controllers associated with such respective valve and fuel control subsystems.

Figure 2:
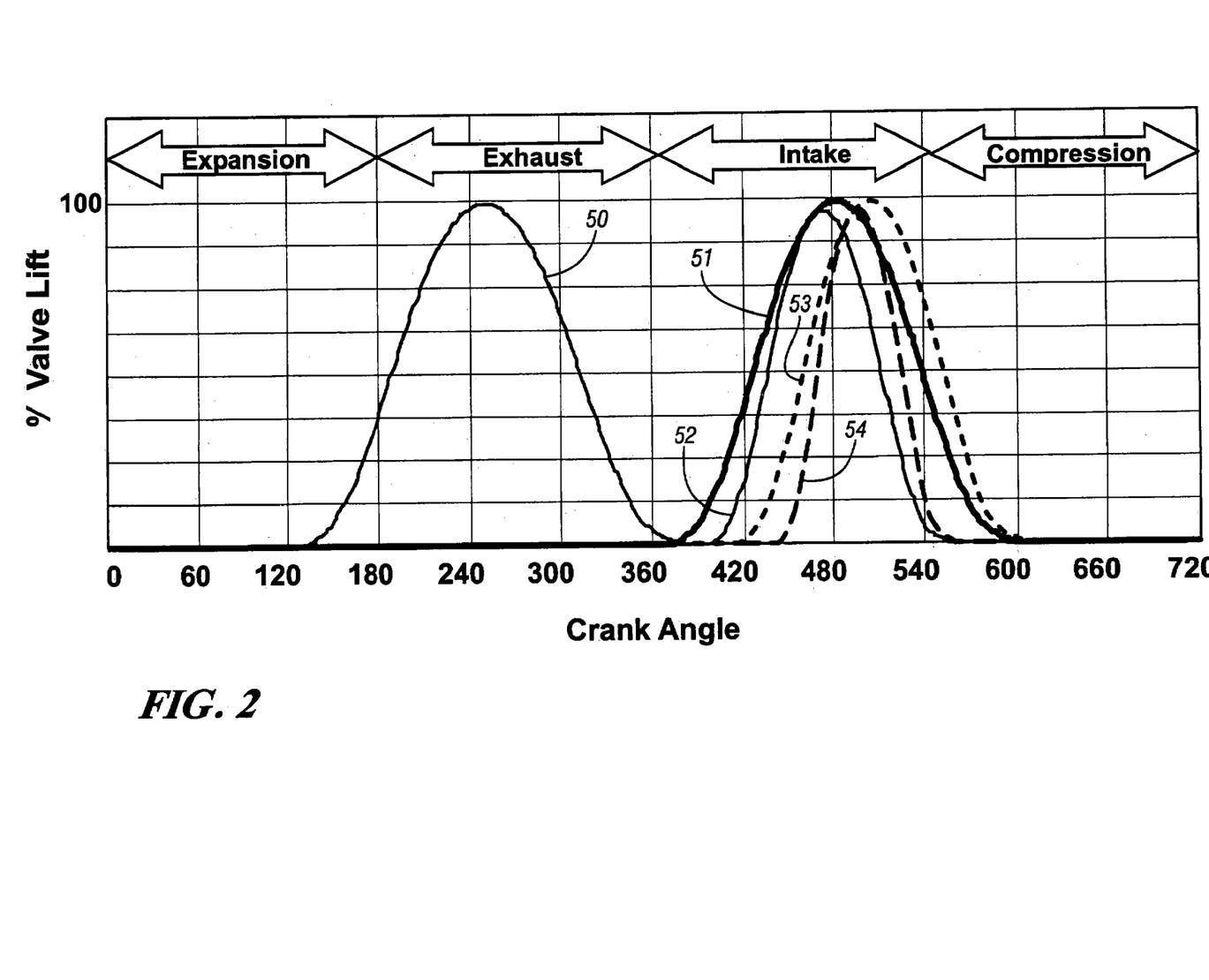
FIG. 2 illustrates various valve lift versus crank angle curves corresponding to exemplary exhaust and intake valve phasing of the single cylinder engine of FIG. 1 in accordance with the method of the present invention.
Figure 3:
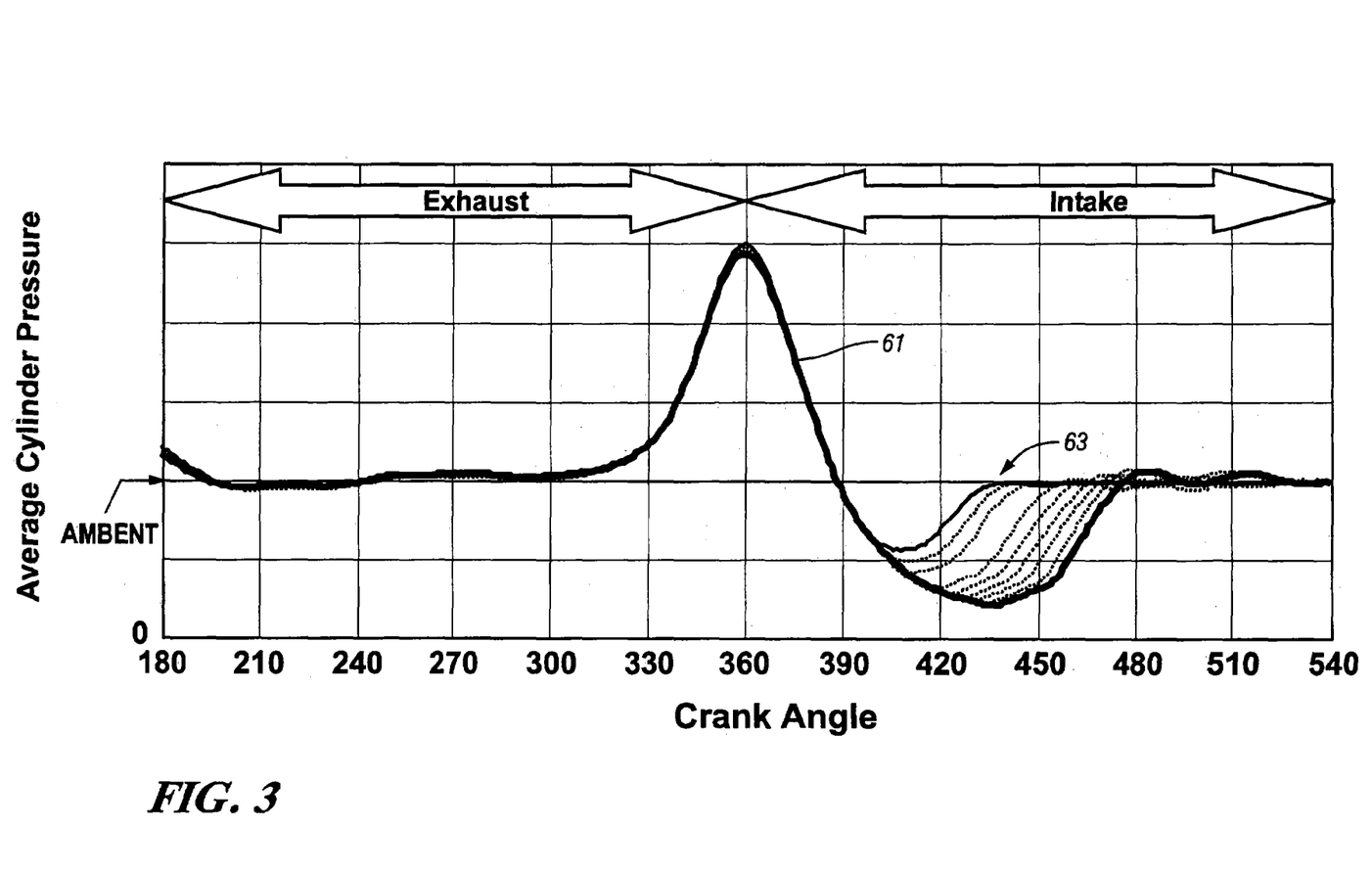
FIG. 3 illustrates various cylinder pressure versus crank angle curves corresponding to the exemplary exhaust and intake valve phasing illustrated in FIG. 2 in accordance with the method of the present invention.

Having thus described the environment and certain application hardware suitable for implementing the method of the present invention, FIGS. 2 and 3 are now referenced to describe the method itself. In FIG. 2, valve lifts of the intake and exhaust valves are plotted against a complete four-stroke combustion cycle. A full 720 degrees or two revolutions of the crankshaft are plotted against the horizontal axis beginning at 0 degrees corresponding to top dead center (TDC) of the piston at the beginning of the expansion stroke (end of the compression stroke) through to the same top dead center position at the end of the compression stroke (beginning of the expansion stroke). By convention and as followed herein, the crankshaft angular positions 0 through 720 refer to degrees of crankshaft rotation after top dead center combustion. The sequentially repeated cycles are delineated across the top of the Figure within double-ended arrows labeled Expansion, Exhaust, Intake and Compression. Each of these cycles correspond to the piston motion between respective ones of top dead and bottom dead center positions and covers a full 180 degrees of crankshaft rotation or one-quarter of the complete four-stroke cycle. In FIG. 3, cylinder pressures are plotted against contiguous portions of the four-stroke combustion cycle, to wit the exhaust and intake strokes as clearly evidenced by the similarly labeled double-ended arrows shown across the top of the Figure.

In the present exemplary exposition of the invention, a four-stroke, single cylinder, 0.55 liter, controlled auto-ignition, gasoline fueled internal combustion engine was utilized in implementing the various valve controls and acquisition of the various data embodied herein. Unless specifically discussed otherwise, all such implementations and acquisitions are assumed to be carried out under standard conditions as understood by one having ordinary skill in the art.

In accordance with the present invention a low pressure event is established within the combustion chamber, preferably by means of phase control over the opening and closing of one or more of the intake and exhaust valves. In the present example illustrated in FIGS. 2 and 3, it is assumed that an exhaust event is caused to occur wherein the exhaust valve is opened for at least a portion of the exhaust stroke from 180 to 360 degrees. The actual opening and closing angles of the exhaust valve during an exhaust event will vary in accordance with such factors as engine speed and exhaust runner geometries as well as other desired engine tuning characteristics. In the present illustrated example the exhaust valve closure is assumed to correspond substantially to 380 degrees or 20 degrees after exhaust stroke TDC. Preferably, the exhaust valve closure occurs within approximately 20 degrees before exhaust stroke TDC to 20 degrees after exhaust stroke TDC. It is generally believed that maximum expulsion of exhaust gases from the combustion chamber will aid in minimizing residual cylinder pressure and such condition is generally consistent with effectuating deeper and longer duration low pressure events. Through certain gas dynamics under certain conditions maximum expulsion occurs when the exhaust valve remains open for some angle after exhaust stroke TDC. More preferably, then, the exhaust valve closure occurs within approximately exhaust stroke TDC to 20 degrees after exhaust stroke TDC.

Consistent with the objective of establishing a low pressure event within the combustion chamber during the intake stroke it may further be desirable that the exhaust event exhaust valve closure absolute phase relative to exhaust stroke TDC is not greater than the intake valve opening phase after exhaust stroke TDC or that minimal valve overlap exists. Generally a certain degree of asymmetry around exhaust stroke TDC as between exhaust valve closure and intake valve opening as described is required in order to establish the desired low pressure conditions within the combustion chamber. If exhaust event exhaust valve closure occurs before exhaust stroke TDC, then it may be desirable to allow at least a similar angle after TDC for the pressure in the combustion chamber to relax before the intake valve begins to open. Preferably, the intake valve opening follows the exhaust valve closing at about 20 to about 60 degrees after exhaust stroke TDC.

In accordance with another feature of the present invention the exhaust valve is opened during at least a portion of the intake event to recirculate or rebreathe combusted gases by drawing them back into the combustion chamber vis-à-vis the exhaust valve. Preferably, this rebreathe event exhaust valve opening occurs subsequent to the opening of the intake valve and more preferably occurs about 10 to about 30 degrees after the intake valve opening. Additionally, the exhaust valve closing associated with this rebreathe event preferably occurs prior to the intake valve closure. And more preferably, this exhaust valve closure occurs about 10 to about 40 degrees prior to the intake valve closure.

The rebreathe event exhaust valve opening is also preferably characterized by a relatively high valve lift. More preferably such valve lift is no greater than about 50% of maximum valve lift.

The general and preferred intake and exhaust valve phasings heretofore described are substantially set forth in the exemplary curves illustrated in FIG. 2. Curve 50 represents an exhaust event exhaust valve profile wherein valve closure occurs at substantially 20 degrees after exhaust stroke TDC. For purposes of exposition it is assumed that the exhaust event is substantially static with respect to exhaust event exhaust valve closure phasing although, as described previously, it is contemplated that in fact phase shifting of the exhaust valve closure is within the scope of the invention in attaining various outcomes and objectives thereof. Intake profiles 51 and 53 corresponding respectively to early (about 12 degrees after exhaust stroke TDC or 372 degrees) and late (about 52 degrees after exhaust stroke TDC or 412 degrees) intake valve openings, both of which intake profiles also illustrate substantial convergence of the intake valve closings at about 60 degrees after intake stroke bottom dead center (BDC). Rebreathe profiles 52 and 54 correlate respectively to the early and late intake valve opening profiles 51 and 53 and each corresponds to a rebreathe event exhaust valve opening initiated at about 30 degrees after the respective correlated intake valve opening. Rebreathe profiles 52 and 54 also illustrate substantial convergence of the rebreathe event exhaust valve closings at about 40 degrees prior to the intake valve closure. If a continuum of such correlated intake and rebreathe profiles were plotted in the Figure with intake valve openings between 372 and 412 degrees and respective correlated rebreathe openings lagging by about 30 degrees, the result would be increasing vacuum levels and durations thereof within the combustion chamber. Of course, in addition to the various low pressure profiles within the combustion chamber which can be achieved with simply phase shifting valve openings as described, additional pressure profiles may be achieved through more complex and independent variations of the exhaust, intake and rebreathe profiles including by way of lift variation in addition to timing. It should be noted also that significant variations in gas constituent mixtures and temperature can also be effected by way of the complex variations of the exhaust, intake and rebreathe profiles that are possible. The operation of the engine as exhibited by the exemplary Figures herein is, as indicated earlier, as a controlled auto-ignition engine.

The valve phase controls to establish a low pressure event within the combustion chamber are carried out to establish pressure level depressions and durations thereof within the combustion chamber that are not found in conventional known four-stroke operation. With reference now to FIG. 3, pressure profiles resulting from the exemplary valve profiles described with respect to FIG. 2 are illustrated. Therein, a family of curves is generally designated by the numeral 61 and is illustrated with respect to 360 degrees of crankshaft rotation, to wit through the exhaust and intake strokes of the complete four-stroke process only as delineated across the top of the Figure within double-ended arrows labeled Exhaust and Intake. Each curve substantially corresponds to a respective intake valve opening at 5 degree increments beginning at 372 degrees and ending at 412 degrees and a corresponding exhaust valve opening lagging the respective intake valve opening by substantially 30 degrees. Cylinder pressure is illustrated on a relative linear scale along the vertical axis with ambient pressure being specifically labeled and assumed to be substantially one standard atmosphere or about 101 kPa. Consistent with the simplified assumption respecting the exhaust event exhaust valve closing at a fixed phase of substantially 20 degrees after exhaust stroke TDC for all of the various intake valve/exhaust event exhaust valve openings, the pressure profiles through about 400 degrees (40 degrees past exhaust stroke TDC) are substantially equivalent. Region 63 generally designates the area of resultant low pressure events or sub-atmospheric pressure conditions established in accordance with the present invention. A first relatively shallow and limited duration low pressure event is sub-atmospheric from substantially just prior to 390 degrees to substantially just after 435 degrees or 75 degrees past exhaust stroke TDC. A second relatively deep and lasting duration low pressure event is sub-atmospheric from substantially just prior to 390 degrees to substantially just prior to 480 degrees. The first low pressure event reaches substantially 42 kPa below ambient or sub-atmospheric or alternatively stated about 42% below ambient or atmospheric or about 58% of ambient or atmospheric. The second low pressure event reaches substantially 75 kPa below ambient or sub-atmospheric or alternatively stated about 75% below ambient or atmospheric or about 25% of ambient or atmospheric. The specific curves illustrated in FIG. 3 are, of course, exemplary with other such curves and profiles being able to be established by virtue of more complex and independent variations of the exhaust, intake and rebreathe profiles including by way of lift variation in addition to timing. For example, further retarding the intake valve opening would effectuate deeper low pressure events. Similarly, deeper low pressure events may be effectuated by retarding further the opening of the rebreathe event exhaust valve opening from the intake valve opening or eliminating a rebreathe event altogether. Where it is desirable to maintain some exhaust gas recirculation, adapting the exhaust event exhaust valve closure may provide an alternative to rebreathe or external exhaust gas recirculation means may be employed to ensure ingestion of combusted gases together with fresh air through the intake valve.

The fueling methodology for an engine operated as described may be selected from any variety of methods. Liquid and gaseous injections are candidates as are TBI, MPFI and DI. Additionally, it is contemplated that single pulse, split pulse, air assisted and other types of delivery may be employed. Also, the type of ignition system employable is variable and includes such non-limiting examples as SI, CI, and controlled auto-ignition.

Figure 4:
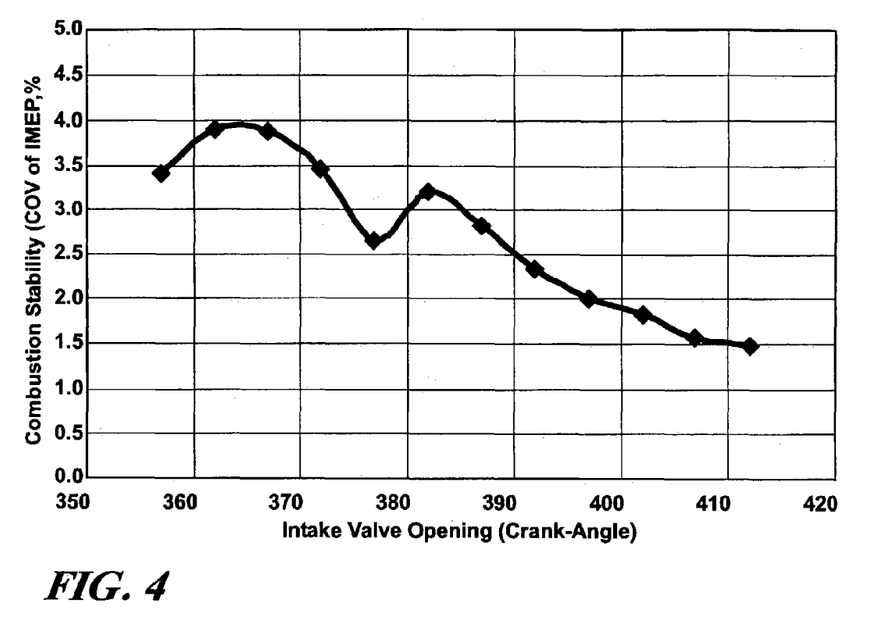
FIG. 4 illustrates an exemplary combustion stability versus intake valve opening phase curve demonstrative of low load limit benefits in accordance with the method of the present invention; and, FIG. 5 illustrates an exemplary combustion stability versus cylinder net mean effective pressure curve demonstrative of low load limit benefits in accordance with the method of the present invention.
Figure 5:
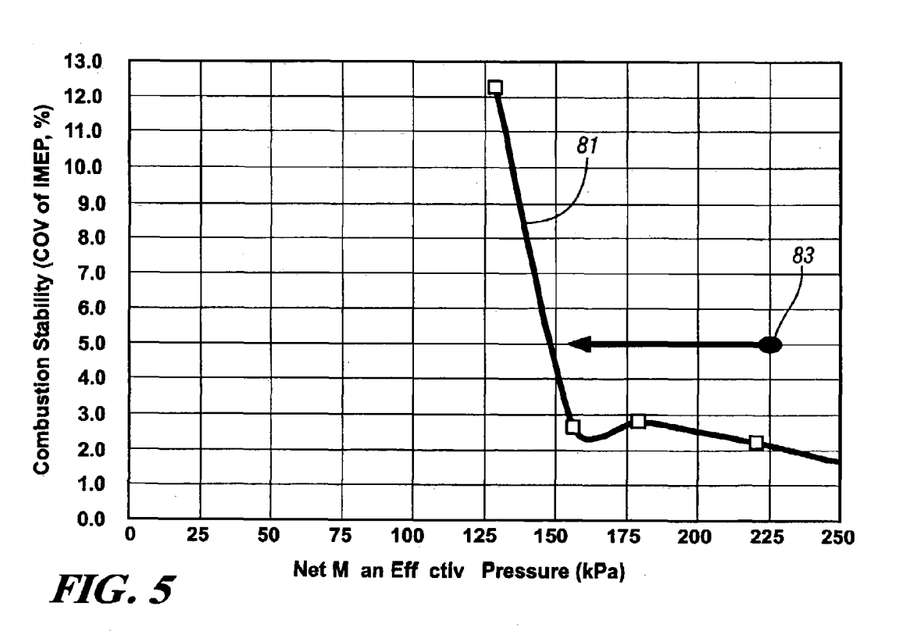

The impact of current invention on the low load limit of the exemplary controlled auto-ignition engine operation is shown in FIG. 4. Without using the current invention, the low load limit of the exemplary—and most typical—four-stroke direct-injection auto-ignition gasoline engine is around 225 kPa Net Mean Effective Pressure (NMEP) with 5% Coefficient of Variation of Indicated Mean Effective Pressure (COV of IMEP) as an indicator. The data plotted in FIG. 4 was acquired with leaned out fueling to substantially 175 kPa NMEP and with implementation of the exemplary intake and exhaust valve profiles heretofore described. The plot of line 71 clearly shows combustion stability improvement with the introduction and expansion of low-pressure events within the combustion chamber as described herein. The clear conclusion drawn is that expanding the sub-atmospheric pressure conditions improves combustion stability and allows the engine to be operated at lower load limits. FIG. 5 is demonstrative of the same clear benefits and advantages of implementing the present invention on a normalized scale of NMEP within the combustion chamber relative to ambient. In that Figure, point 83 represents the low load limit of substantially 225 kPa in terms of NMEP with 5% COV of IMEP as the indicator. Points to the left in the Figure (i.e. lower NMEPs) correspond to lower loads. The plot of line 81 clearly shows significantly less NMEPs before the acceptable 5% or less COV of IMEP is reached, effectively moving the low load limit point to about 150 kPa NMEP.

The present invention has been described with respect to certain preferred embodiments and variations herein. Other alternative embodiments, variations ad implementations may be implemented and practiced without departing from the scope of the invention which is to be limited only by the claims as follow:

What is claimed is:

1. Method of operating a four-stroke internal combustion engine including a variable volume combustion chamber defined by a piston reciprocating within a cylinder between top-dead center and bottom-dead center points and an intake valve and an exhaust valve controlled during repetitive, sequential exhaust, intake, compression and expansion strokes of said piston comprising:
   providing an exhaust event during which the exhaust valve is open for expelling combusted gases from the combustion chamber;
   subsequent to the exhaust event, providing a period of simultaneous closure of the exhaust and intake valves during at least a portion of the intake stroke of the piston effective to establish a sub-atmospheric pressure condition within the combustion chamber; and,
   providing an intake event during which the intake valve is open for ingesting fresh air into the combustion chamber.

2. Method of operating a four-stroke internal combustion engine as claimed in claim 1 wherein said sub-atmospheric pressure condition within the combustion chamber reaches at least about 42 kPa sub-atmospheric.

3. Method of operating a four-stroke internal combustion engine as claimed in claim 1 wherein said sub-atmospheric pressure condition within the combustion chamber terminates not earlier than about 75 degrees past exhaust stroke top dead center.

4. Method of operating a four-stroke internal combustion engine as claimed in claim 1 wherein said sub-atmospheric pressure condition within the combustion chamber reaches at least about 42 kPa sub-atmospheric and terminates not earlier than about 75 degrees past exhaust stroke top dead center.

5. Method of operating a four-stroke internal combustion engine as claimed in claim 1 further comprising providing a rebreathe event wherein said exhaust valve is open during at least a portion of the intake event.

6. Method of operating a four-stroke internal combustion engine as claimed in claim 5 wherein said rebreathe event is initiated subsequent to initiation of said intake event.

7. Method of operating a four-stroke internal combustion engine as claimed in claim 6 wherein said rebreathe event is terminated prior to termination of said intake event.

8. Method of operating a four-stroke internal combustion engine as claimed in claim 5 wherein said rebreathe event is characterized by lift of said exhaust valve no greater than about 50% of maximum valve lift.

9. Method of operating a four-stroke internal combustion engine as claimed in claim 5 wherein said rebreathe event is initiated about 10 to about 30 degrees subsequent to initiation of said intake event.

10. Method of operating a four-stroke internal combustion engine as claimed in claim 9 wherein said intake event is initiated about 20 to about 60 degrees after exhaust stroke top dead center.

11. Method of operating a four-stroke internal combustion engine as claimed in claim 5 wherein said rebreathe event is terminated prior to termination of said intake event.

12. Method of operating a four-stroke internal combustion engine as claimed in claim 11 wherein said rebreathe event is terminated about 10 to about 40 degrees prior to termination of said intake event.

13. Method of operating a four-stroke internal combustion engine as claimed in claim 12 wherein said intake event terminates about 20 to about 60 degrees after intake stroke bottom dead center.

14. Method of operating a four-stroke internal combustion engine as claimed in claim 5 wherein said intake event is initiated about 20 to about 60 degrees after exhaust stroke top dead center and is terminated about 20 to about 60 degrees after intake stroke bottom dead center, and said rebreathe event is initiated about 10 to about 30 degrees subsequent to initiation of said intake event and is terminated about 10 to about 40 degrees prior to the termination of said intake event.

15. Method of operating a four-stroke internal combustion engine including a variable volume combustion chamber defined by a piston reciprocating within a cylinder between top-dead center and bottom-dead center points and an intake valve and an exhaust valve controlled during repetitive, sequential exhaust, intake, compression and expansion strokes of said piston comprising:
 establishing a low pressure event within the combustion chamber during the intake stroke of the piston; and,
 establishing a combustion chamber rebreathe event during the intake stroke of the piston by controlling a rebreathe event exhaust valve opening and closing wherein the rebreathe event exhaust valve opening occurs during the low pressure event;
 wherein said low pressure event is established by controlling phasing of an exhaust event exhaust valve closure and the intake valve opening; and,
 wherein the exhaust event exhaust valve closure absolute phase relative to exhaust stroke top dead center is not greater than the intake valve opening phase after exhaust stroke top dead center.

16. Method of operating a four-stroke internal combustion engine as claimed in claim 15 wherein the exhaust event exhaust valve closure occurs before exhaust stroke top dead center.

17. Method of operating a four-stroke internal combustion engine as claimed in claim 16 wherein the intake valve opening occurs about 0 to about 60 degrees after the exhaust valve closure.

18. Method of operating a four-stroke internal combustion engine as claimed in claim 17 wherein the exhaust event exhaust valve closure occurs about 0 to about 20 degrees after exhaust stroke top dead center.

19. Method of operating a four-stroke internal combustion engine as claimed in claim 15 wherein the exhaust event exhaust valve closure occurs about 20 degrees before exhaust stroke top dead center to about 20 degrees after exhaust stroke top dead center.

20. Method of operating a four-stroke internal combustion engine as claimed in claim 15 wherein the rebreathe event exhaust valve opening occurs about 10 to about 30 degrees after the intake valve opening.

21. Method of operating a four-stroke internal combustion engine as claimed in claim 15 wherein the intake valve opening occurs about 20 degrees after exhaust stroke top dead center to about 60 degrees after exhaust stroke top dead center.

22. Method of operating a four-stroke internal combustion engine as claimed in claim 15 wherein exhaust event exhaust valve closure occurs about 20 degrees before exhaust stroke top dead center to about 20 degrees after exhaust stroke top dead center and the intake valve opening occurs about 20 degrees after exhaust stroke top dead center to about 60 degrees after exhaust stroke top dead center.

23. Method of operating a four-stroke internal combustion engine as claimed in claim 22 wherein exhaust event exhaust valve closure occurs about exhaust stroke top dead center to about 20 degrees after exhaust stroke top dead center.

24. Method of operating a four-stroke internal combustion engine as claimed in claim 21 wherein the rebreathe event exhaust valve opening occurs about 10 to about 30 degrees after the intake valve opening.

25. Method of operating a four-stroke internal combustion engine as claimed in claim 15 wherein exhaust event exhaust valve closure occurs about 20 degrees before exhaust stroke top dead center to about 20 degrees after exhaust stroke top dead center, the intake valve opening occurs about 20 degrees after exhaust stroke top dead center to about 60 degrees after exhaust stroke top dead center, and the rebreathe event exhaust valve opening occurs about 10 to about 30 degrees after the intake valve opening.

26. Method of operating a four-stroke internal combustion engine as claimed in claim 17 wherein exhaust event exhaust valve closure occurs about exhaust stroke top dead center to about 20 degrees after exhaust stroke top dead center, the intake valve opening occurs about 20 degrees after exhaust stroke top dead center to about 60 degrees after exhaust stroke top dead center, and the rebreathe event exhaust valve opening occurs about 10 to about 30 degrees after the intake valve opening.

27. Method of operating a four-stroke internal combustion engine including a variable volume combustion chamber defined by a piston reciprocating within a cylinder between top-dead center and bottom-dead center points, and at least one intake valve and one exhaust valve controlled during repetitive, sequential exhaust, intake, compression and expansion strokes of said piston comprising:
  providing a closed exhaust valve and a closed intake valve during an expansion stroke of said piston;
  providing an open exhaust valve and a closed intake valve during an exhaust stroke of said piston;
  providing a closed exhaust valve and a closed intake valve during an intake stroke of said piston to establish a low pressure condition within the combustion chamber;
  providing an open exhaust valve and an open intake valve during said intake stroke of said piston to ingest combusted gases and fresh air, respectively, into said combustion chamber; and,
  providing a closed exhaust valve and a closed intake valve during a compression stroke of said piston.

28. Method of operating a four-stroke internal combustion engine as claimed in claim 27 wherein closure of the exhaust valve that is open during the exhaust stroke occurs at an absolute phase angle relative to exhaust stroke top dead center about not greater than the phase angle after exhaust stroke top dead center at which opening of the intake valve occurs.

29. Method of operating a four-stroke internal combustion engine as claimed in claim 28 wherein the closure of the exhaust valve that is open during the exhaust stroke occurs about 20 degrees before exhaust stroke top dead center to about 20 degrees after exhaust stroke top dead center.

30. Method of operating a four-stroke internal combustion engine as claimed in claim 27 wherein the opening of the intake valve occurs about 20 degrees after exhaust stroke top dead center to about 60 degrees after exhaust stroke top dead center.

31. Method of operating a four-stroke internal combustion engine as claimed in claim 28 wherein the closure of the exhaust valve that is open during the exhaust stroke occurs about exhaust stroke top dead center to about 20 degrees after exhaust stroke top dead center.

32. Method of operating a four-stroke internal combustion engine as claimed in claim 31 wherein the opening of the intake valve occurs about 20 degrees after exhaust stroke top dead center to about 60 degrees after exhaust stroke top dead center.

33. Method of operating a four-stroke internal combustion engine as claimed in claim 32 wherein opening of the exhaust valve that is open during said intake stroke of said piston occurs about 10 to about 30 degrees after the intake valve opening.

34. Method of operating a four-stroke internal combustion engine including a variable volume combustion chamber defined by a piston reciprocating within a cylinder between top-dead center and bottom-dead center points and an intake valve and an exhaust valve controlled during repetitive, sequential exhaust, intake, compression and expansion strokes of said piston comprising:
  establishing a low pressure event within the combustion chamber during the intake stroke of the piston, wherein the low pressure event terminates not earlier than about 75 degrees past exhaust stroke top dead center; and,
  establishing a combustion chamber rebreathe event during the intake stroke of the piston by controlling a rebreathe event exhaust valve opening and closing wherein the rebreathe event exhaust valve opening occurs during the low pressure event.

35. The method of claim 34, wherein said low pressure event reaches at least about 42 kPa sub-atmospheric.

36. Method of operating a four-stroke internal combustion engine including a variable volume combustion chamber defined by a piston reciprocating within a cylinder between top-dead center and bottom-dead center points and an intake valve and an exhaust valve controlled during repetitive, sequential exhaust, intake, compression and expansion strokes of said piston comprising:
  operating the four-stroke internal combustion engine in a substantially unthrottled condition;
  establishing a low pressure event within the combustion chamber during the intake stroke of the piston by controlling phasing of an exhaust event exhaust valve closure and the intake valve opening; and,
  establishing a combustion chamber rebreathe event during the intake stroke of the piston by controlling a rebreathe event exhaust valve opening and closing wherein the rebreathe event exhaust valve opening occurs during the low pressure event.

37. The method of claim 36, wherein the low pressure event terminates not earlier than about 75 degrees past exhaust stroke top dead center.

38. The method of claim 36, wherein said low pressure event reaches at least about 42 kPa sub-atmospheric.

39. The method of claim 36, wherein the low pressure event terminates not earlier than about 75 degrees past exhaust stroke top dead center, and reaches at least about 42 kPa sub-atmospheric.

* * * * *